US005848456A

United States Patent [19]

Sjöqvist

[11] Patent Number: 5,848,456

[45] Date of Patent: Dec. 15, 1998

[54] LOCKING DEVICE FOR A CONNECTOR

[75] Inventor: Ingvar Sjöqvist, Tullinge, Sweden

[73] Assignee: Telefonaktiebolaget LM Ericsson, Stockholm, Sweden

[21] Appl. No.: 825,950

[22] Filed: Apr. 3, 1997

[30] Foreign Application Priority Data

Apr. 4, 1996 [SE] Sweden ................................ 9601307

[51] Int. Cl.[6] ............................ H01R 4/50; H01R 13/00; F16B 21/08

[52] U.S. Cl. ........................... 24/618; 439/357; 439/358; 24/297; 24/453; 411/508

[58] Field of Search ............................ 24/618, 619, 614, 24/604, 107, 453, 458, 457, 623, 625, 572, 297; 411/508; 439/353, 357, 358; 403/326, 329

[56] References Cited

U.S. PATENT DOCUMENTS 4,114,339 9/1978 Ito ........................................ 24/618 X
4,312,614 1/1982 Palmer et al. ........................ 24/297 X
4,404,933 9/1983 Kuczenski ............................ 24/618 X
4,407,413 10/1983 Jansson ................................ 24/618 X
4,669,797 6/1987 Bourdon .
4,715,095 12/1987 Takahashi ................................ 24/453
4,746,306 5/1988 Yurtin et al. .
5,083,926 1/1992 Kissinger et al. .................. 411/508 X
5,186,591 2/1993 Malks ..................................... 411/508
5,416,954 5/1995 Sobin ........................................ 24/297
5,439,387 8/1995 Hayashi .
5,593,262 1/1997 Gedeon et al. ..................... 411/508 X

FOREIGN PATENT DOCUMENTS 0 622 869 A2 11/1994 European Pat. Off. .

*Primary Examiner*—James R. Brittain
*Assistant Examiner*—Robert J. Sandy
*Attorney, Agent, or Firm*—Burns, Doane, Swecker & Mathis, L.L.P.

[57] ABSTRACT

Locking device for a connector for cooperation with a recess of a member with which the connector is to be connected, said locking device being made of spring elastic material and comprising two shanks which are movable towards and away from each other. At least one of the shanks has, at its end opposite the connector, on its side facing away from the other shank, a protruding hooking means. The shanks are tapered in the direction towards the end opposite the connector and pass over into resilient portions, which have substantially even thickness, have thinner walls than the shanks and project towards each other, said resilient portions being connected by a connecting portion. At the ends facing the connector the shanks form a functionally common base portion.

10 Claims, 4 Drawing Sheets

FIG. 1
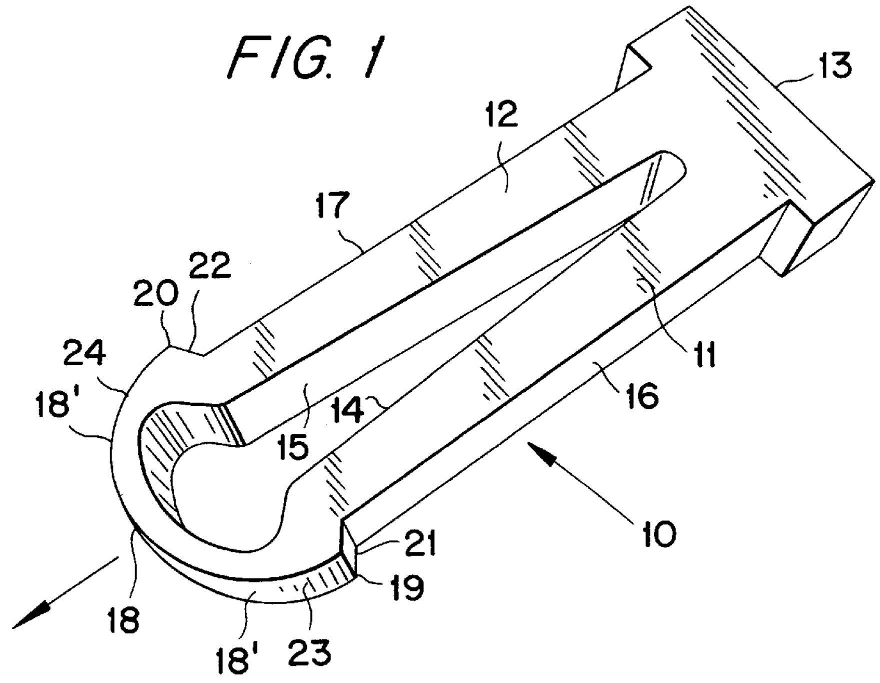
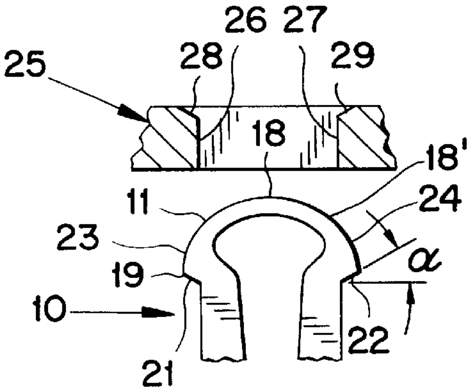
FIG. 2A
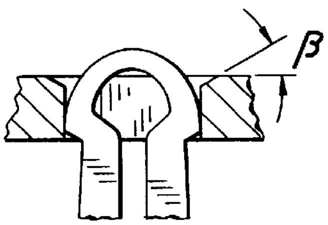
FIG. 2B
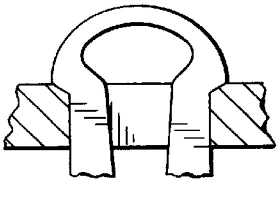
FIG. 2C

LOCKING DEVICE FOR A CONNECTOR

TECHNICAL FIELD

The invention relates to a locking device for a connector for cooperation with a recess of a member with which the connector is to be connected, said locking device being made of a spring elastic material and comprising two shanks which are movable towards and away from each other, at least one of the shanks at the en opposite the connector, on its side facing away from the other shank exhibiting a protruding hooking, means having an insert surface and a locking surface, said surfaces being arranged to cooperate with insert surfaces and locking surfaces within the recess.

STATE OF THE ART

The above referenced locking devices are used for different types of electrical connectors having spring loaded connector members, e.g. for mobile telephone equipments. The locking device should require small connecting and disconnecting force in order for such connectors to be quick and easy to connect and disconnect. The connectors are often accessible on the outside of the apparatus, and must on the other hand therefore also demand sufficiently large outer disconnecting force in order to prevent unintentional disconnection due to mechanical influence because of bumps and strokes. Furthermore, it is an requirement that the connector is locked in connected position and is not influenced by the operating conditions. In mobile equipment connectors must not be influenced by the vibrations which might appear during the severest possible operating conditions under which the apparatus is intended to be operate.

EP-A-0 622 869 discloses a connector comprising an electrical female connector, which is mounted within a car body, and a male connector. Both connectors comprise tubular house portions surrounding a number of terminals. Within the female connector is provided a hole member having a deep hole to receive a spring plate provided within the male connector, said spring plate having an outer shape corresponding to the shape of the deep hole within the female connector. The spring plate comprises two shanks each being fitted within the male connector. From the fittings the shanks are essentially parallel and on the middle the spring plate has a constricted portion and subsequently the shanks are again directed towards each other meeting in a front end having the shape of a rhomb. This connection between the shanks has the function of a hinge to support the compression of the shanks when the spring plate is inserted into the hole. The purpose of the connector is to achieve a solid connection between the female and male connector in order to maintain electrical contact so that states of incomplete contact are avoided. According to EP-A-0 622 869 this is achieved by the spring plate which in order to obtain electrical contact must pass a constricted portion within the hole which corresponds to the constriction of the spring plate, the spring plate subsequently automatically being brought into place. If the spring plate on the other hand is not inserted sufficiently far it is pushed out from the hole and electrical contact is interrupted. Disconnection of the connector must be accomplished by traction force only.

As a result of a continuing effort for miniaturization and increasing number of force loaded connector members within each connector, e.g. for parallel transmission of data, higher demands are placed on these connectors, and therefore the known constructions cannot be miniaturized while maintaining the desired characteristics despite better materials. It is further a desire that the connector is easy to disconnect and has such a construction that it can withstand a certain torque in order to further facilitate disconnection.

THE INVENTION

The purpose of the present invention is to further develop a locking device for a connector in view of the described problems and requirements, thereby considerably reducing the size of the connector without loosing the spring characteristics, and handleability or function safety. Above all the invention is aiming at achieving a locking device for a connector which easily can be connected by the locking device functioning as a guide for connection and is easy to disconnect by pulling force and/or level action, at the same time not being influenced by the operating conditions in connected position. This purpose is achieved by a locking device for a connector cooperating with a recess of a member, to which the connector is to be connected. The locking device is made of spring elastic material and comprises two shanks which are movable towards and away from each other, at least one of the shanks having a protruding hooking means. The shanks are tapering in a direction towards the end opposite the connector and pass over into resilient, which have substantially even thickness, have thinner walls than the shanks and project towards each other, said resilient portions being connected by a connecting portion. At the ends facing the connector the shanks form a functionally common base portion.

Due to the resilient portions and the connecting portion having a substantially thinner construction than the resilient shanks a large part of the spring function can be transferred from the shanks to the much more efficient resilient portions adjacent to the hooking means.

SHORT DESCRIPTION OF THE DRAWINGS

The invention will be described further below reference being made to the accompanying drawings, in which FIG. 1 is a perspective view of a locking device for a connector, FIGS. 2A–2C are side elevations of a locking device according to FIG. 1 in different positions during a connection procedure, FIG. 3 is a perspective view of a two pole electrical connector with a locking device, FIGS. 4A and 4B are side elevations partly in cross section of a mobile telephone fixed at two locations of connection within a holder for the telephone, FIGS. 5A–5C are an end view of a mobile telephone together with side elevations of different types of accompanying connectors provided with locking devices according to the invention, FIG. 6 is a perspective view of an alternative embodiment of a locking device, FIG. 7 is a perspective view of another alternatively modified locking device, and FIG. 8 is a perspective view of a further alternatively modified locking device.

DETAILED DESCRIPTION OF THE INVENTION

Figure 3:
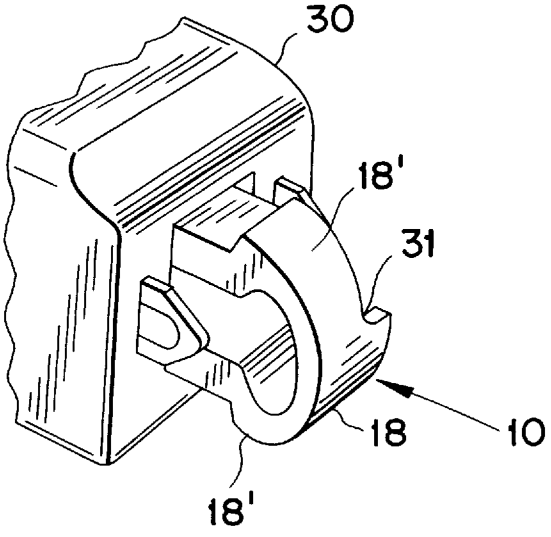

A locking device 10 in FIG. 1 for an electrical connector comprises two shanks 11, 12 which are joined at their the rear ends by a common base portion 13 intended to be fixed to a connector. For reasons of manufacturing the base portion 13 can be divided, the parts of the base portion then having such shape that they functionally work as one part only; see FIG. 7. The shanks 11, 12 are pivotally movable towards and away from each other, and in order to permit a sufficiently large compression or angular motion of the shanks 11, 12 in the direction towards each other the shanks are tapered in a direction away from the base portion and the plane inner surfaces 14, 15 of the shanks form an angle with each other when the locking device is in an unloaded state.

At the end of the locking device 10 opposite the base portion 13 the two shanks 11, 12 passes over into resilient portions 18' which have a substantially even thickness, have thinner walls than the shanks, extend towards each other, and are connected by a connecting portion 18. The shape of the portions 18' together with the connecting portion 18 can be an arch, i.e. almost semicircular, have a softer elliptic form or a more planar connecting portion 18 with larger radius and portions 18' passing over into the shanks 11, 12 with smaller radius, forming a blunter shape. Also other shapes of the portions 18 and 18' are possible, as will be described further below. The resilient portions 18' connect to the shanks 11, 12 under the formation of the hooking means 19, 20 each comprising a locking surface 21, 22 facing the base portion 13, said locking surface being formed by the end of the resilient portion 18 at its connection to the shank 11, 12, and an insertion surface 23, 24 in the direction of insert, according to the arrow shown in FIG. 1. Due to the resilient portions 18' and the connecting portion 18 being shaped substantially thinner than the resilient shanks 11, 12, a large part of the resiliency can be moved from the shanks 11, 12 to the considerably more efficient portions 18 and 18' adjacent to the hooking means 19, 20. The size of the locking device 10, and therefore consumption of material, can be decreased considerably without the characteristics of resiliency being deteriorated. The length of the part of the locking device 10 being exposed outside a connector is between 3 and 25 mm, preferably <10 mm.

The locking device 10 is intended to be the male portion in a substantially torsionally rigid plug contact of a connector. In FIG. 2 is shown the female portion of the connector, which is a recess 25 having a rectangular aperture with planar, substantially parallel insert surfaces or side walls 26, 27, and internal angular locking surfaces 28, 29. The insert surfaces 23, 24 directed in the direction of insertion facilitate the insertion of the locking device 10 into the recess 25. Thus, the portions 18 and 18' make the locking device 10 selfcentering towards the recess 25 and therefore admits a larger degree of deviation at the insertion of the locking device 10 into the recess 25.

Figure 6:
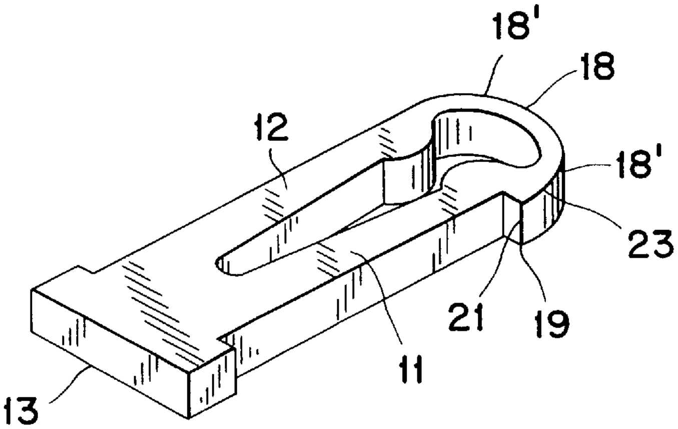

An angle $\alpha$ between each locking surface 21, 22 of the locking device 10 and a plane perpendicular to the longitudinal axis of the locking device 10 may be varied in dependence of the desired locking force. A small angle $\alpha$ provides a large locking force of the locking device 10 while a large angle $\alpha$ provides a small locking force. An angle $\alpha$ of approximately 30° is preferred but larger or smaller angles are also possible. For example, an angle $\alpha<0°$ implies that the hooking means 19, 20 provide an irreversible locking by being in the form of a barb, and $\alpha>90°$ that the ends of the arch 18 pass over directly to the shanks 11, 12 without forming any hooking means 19, 20, see FIG. 6. The angle $\alpha$ may of course be different at the respective hooking means. The locking surfaces 28, 29 within the recess 25 having an angle $\beta$ between each locking surface 28 or 29 and a plane perpendicular to the direction of insertion within the recess do not necessarily have angles $\beta$ of mutually the same size.

Figure 5A:
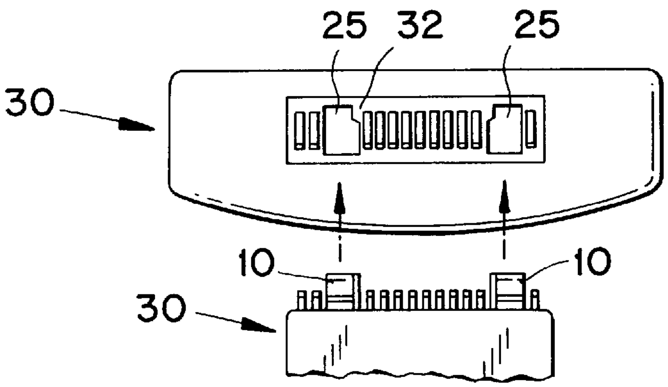
Figure 5B:
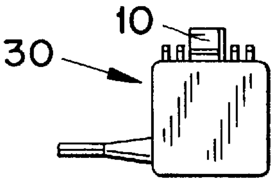
Figure 5C:
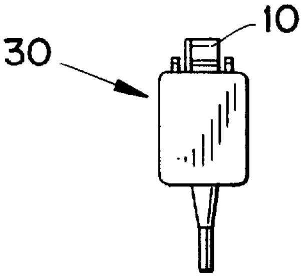

FIG. 3 shows that the locking device 10 provided at a connector 30 at the portions 18 and 18' can have an asymmetrical outer shape or so called key shape in order to prevent insertion in the wrong position into the recess 25 which is correspondingly asymmetrically profiled, see FIGS. 5A–5C. The asymmetrical profiling is achieved e.g. by a substantially right angle recess 31 in the locking device 10, said recess 31 extending at least over the part of the locking device being exposed outside the connector 30. In the same manner a key shape is formed in the recess 25 by e.g. a cut in a corner 32, see FIGS. 5A–5C.

Figure 7:
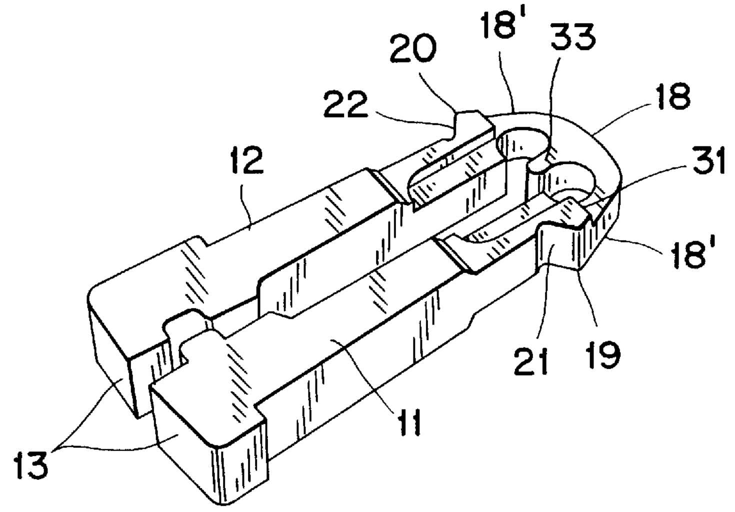
Figure 8:
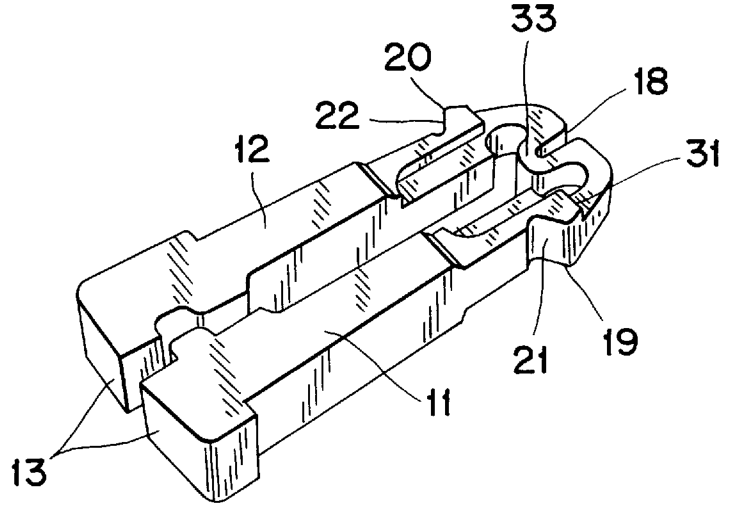

The connecting portion 18 is shown in FIGS. 1–6 with even thickness but may according to FIG. 7 along the longitudinal axis of the locking device have a tongue 33 directed towards the base portion 13. When the recess 31 also extends over the tongue 33 a more efficient key shape can be achieved. The tongue 33 may also be shaped according to FIG. 8 where the tongue 33 is not solid but is formed in that the connecting portion 18, which in this case has a thickness substantially corresponding to the thickness of the portions 18', has a curved, droplike form. Due to the tongue 33 a more resistant locking device can be achieved and the embodiment according to FIG. 8 prevents e.g. a collapse of the connecting portion if the locking device is inserted with an angle into the recess 31 as the connecting portion 18 is elongated and the tensions within the material at external mechanical stress then are decreased.

The connector 30 comprising a locking device according to the invention may well be used within areas where locking with small dimensions and large locking force is required at the same time as the connector should be easy to disconnect by lever action.

Figure 4A:
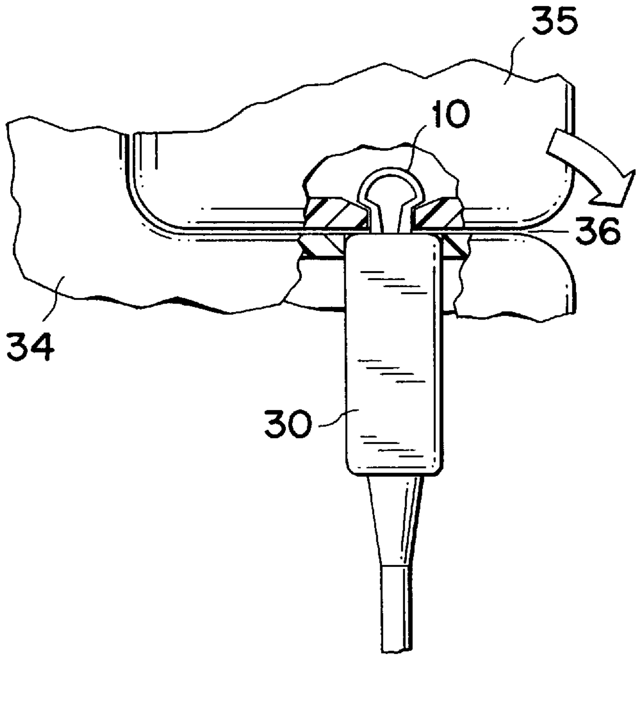

FIG. 4A shows a connector 30 fixed in a telephone holder 34 in a vehicle having a locking device. A telephone 35 can then be disconnected and detached from the holder 34 by lever action in the direction of the arrow around a point of action 36 between the telephone 35 and the fixed holder 34. As described above the hooking means 19, 20 of the locking device 10, see FIG. 2, may have angles a of mutually different sizes, and especially when the locking device 10 is disconnected by means of lever action it may be advantageous if the hooking means 19 or 20 closest to the lever hinge has a smaller angle $\alpha$ than the angle $\alpha$ for the hooking means 19 or 20 situated farthest from the lever hinge, so that the locking device 10 then requires a smaller disconnecting force.

Figure 4B:
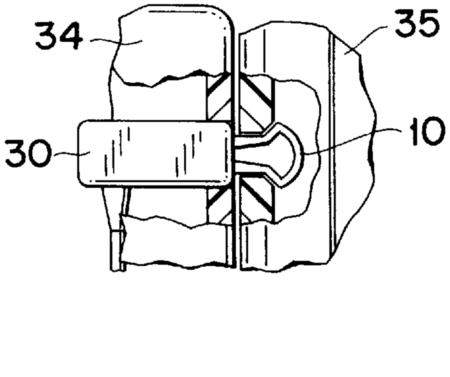

In cases where a large number of connections and disconnections are required without the locking characteristics being deteriorated, a locking device 10 with a small locking force may be used in a connector 30, see FIG. 4B. This locking device 10 which may be provided in a connector 30 that may be connected at the back of the telephone 35 and is attached to the holder 34 e.g. for an external antenna, is disconnected by mere pulling force without lever action. The locking device 10 may also be used at different types of suspension applications.

By the combined arrangement in FIGS. 4A and 4B the telephone 35 may be securely connected mechanically and electrically at two different locations in the holder 34 with substantially only one operation. A separate lock does not have to be detached at the disconnection, which is accomplished by the user simply grasping the telephone 35 at the top and pulling it towards himself, the locking device 10, in FIG. 4B, first being detached by pulling force, and the locking device 10, in FIG. 4A, then being detached by lever action.

If the connector 30 is not provided in a fixed holder 32 but instead is a free connector, such as a full function connector

30, shown in FIGS. 5A–5C intended for data transmission, an audio connector 30 or a battery charger contact 30, it may of course be detached in a corresponding way by lever action from the point of action of the locking device 10 in the recess 25 of the telephone 35.

The locking device is suitably made of a rigid or semi-rigid elastical polymer material, e.g. acetal amide such as nylon etc., but also metal can be used. Important features of the material are among other things high toughness and rigidity, good abrasive and friction characteristics, temperature resistance and high dimensional stability. The type of material used depends on the field of application, outer conditions, environmental requirements etc.

I claim:

1. A locking device for a connector (30) for cooperation with a recess (25) of a member with which the connector (30) is to be connected, said locking device (10) being made of a spring elastic material and comprising two shanks (11, 12) which are movable towards and away from each other, at least one of the shanks (11, 12), at the end opposite the connector, on its side facing away from the other shank (11, 12) exhibiting a protruding hooking means (19, 20) having an insert surface (23, 24) and a locking surface (21, 22), said surfaces being arranged to cooperate with insert surfaces (26, 27) and locking surfaces (28, 29) within the recess (25), characterized in that the shanks (11, 12) are tapered in the direction towards the end opposite the connector (30) and pass over into resilient sections (18'), wherein said resilient sections (18') have substantially even thickness, wherein said resilient sections have thinner walls than the shanks, and wherein said resilient sections project towards each other under the formation of the hooking means (19, 20), the resilient sections (18') are connected by a connecting portion (18), and the shanks (11, 12) form a functionally common base portion (13) at the ends facing the connector.

2. The locking according to claim 1, characterized in that the connecting portion (18) forms an arch together with the resilient sections (18').

3. The locking device according to claim 1, characterized in that the connecting portion (18) has even thickness.

4. The locking device according to claim 1, characterized in that the connecting portion (18) has a tongue (33) which is directed along the longitudinal axis of the locking device (10) towards the base portion (13).

5. The locking device according to claim 1, characterized in that an angle ($\alpha$) between the locking surface (21, 22) of the hooking means and a plane which is perpendicular to the longitudinal axis of the locking device is 0°–90°, preferably about 30°.

6. The locking device according to claim 1, characterized in that the locking device (10) has a recess (31) along at least a part of its length in order to achieve a key function.

7. The locking device according to claim 1, characterized in that the length of the part of the locking device (10) which is exposed outside the connector (30) is between 3 and 25 mm, preferably less than 10 mm.

8. The locking device according to claim 1, characterized in that the locking device (10) is made of polymer material, preferably polyamide or acetal.

9. The locking device according to claim 1, characterized in that the locking device (10) is made of metal.

10. A connector (30) comprising one or several locking devices (10) according to claim 1.

* * * * *